United States Patent [19] [11] 3,810,114
Yamada et al. [45] May 7, 1974

[54] DATA PROCESSING SYSTEM

[75] Inventors: Hirohide Yamada; Yoshiaki Nakayama, both of Tokyo, Japan

[73] Assignee: Tokyo Shibaura Electric Co., Ltd., Kawasaki-shi, Japan

[22] Filed: Dec. 29, 1972

[21] Appl. No.: 319,357

[30] Foreign Application Priority Data

Dec. 29, 1971 Japan 46-708
Dec. 29, 1971 Japan 46-2067

[52] U.S. Cl. 340/172.5
[51] Int. Cl. G06f 3/00
[58] Field of Search 340/172.5

[56] References Cited

UNITED STATES PATENTS

| | | | |
|---|---|---|---|
| 3,693,161 | 9/1972 | Price et al. | 340/172.5 |
| 3,710,324 | 1/1973 | Cohen et al. | 340/172.5 |
| 3,508,206 | 4/1970 | Norberg | 340/172.5 |

*Primary Examiner*—Harvey E. Springborn
*Attorney, Agent, or Firm*—Flynn & Frishauf

[57] ABSTRACT

A data processing system wherein a plurality of data processing units including an arithmetic operation unit, memory unit and other units attached to an electronic computer are connected through a main bus in parallel relationship with each other and at least said arithmetic operation unit and memory unit are connected to each other through a supplementary bus. A selected two of said plurality of units are connected to each other through an interface circuit on the side of a main bus assembly under control of a main bus control unit so as to effect exchange of data therebetween. The arithmetic operation unit and memory unit are connected to each other through an interface circuit on the side of a supplementary bus assembly for exchange of data independently of the operating condition of the main bus assembly.

10 Claims, 10 Drawing Figures

DATA PROCESSING SYSTEM

BACKGROUND OF THE INVENTION

This invention relates to a data processing system and more particularly to a data processing system designed to transmit data through the same bus assembly from one unit to another such as a logical unit, memory unit and input-output (I/O) unit.

Due to the recent development of a memory element included in a data processing system, for example, an electronic computer, a memory unit as a whole has attained a quicker operation, accelerating the processing of data by such computer. Where, therefore, the computer is applied in the work of, for example, controlling a plant, the operating speed of the computer now rarely raises a problem as in the past. But elevation of its reliability has come to assume a greater importance.

The prior art electronic computer generally has a memory channel associated with a memory unit and an input-output (I/O) channel related to a logical unit, namely, a central processing unit (hereinafter referred to as "CPU"). This arrangement, however, causes the units associated with said channels to present a lower adaptability for mutual exchange of data. Further, the conventional computer is a type in which undue importance is attached to the memory unit or CPU, namely, a system in which the CPU, together with a control unit, is connected to, for example, a memory unit through one bus and an I/O unit is connected to said CPU or control unit through another bus, thus preventing data from being exchanged among various units, unless the data are transmitted through the memory unit or CPU. Moreover, the aforesaid memory channel and I/O channel are fixed in place, presenting difficulties in enlarging the capacity of such system.

For resolution of the aforesaid difficulties, there has recently been proposed a data processing system wherein a plurality of data processing units including, for example, the CPU and memory unit are connected in parallel to a bus assembly, to which a bus control unit is connected; and said bus control unit controls the operation of any of the data processing units according to a request for the use of the bus assembly delivered therefrom. According to the abovementioned data-processing system, where any of the data processing units makes a request for the use of the bus assembly, the bus control unit detects said request and delivers a "who" signal to, for example, a first unit which is supposed to have made such request. When the first unit does not make its own request for the use of the bus assembly when supplied with the "who" signal, then the first unit conducts the "who" signal to the immediately succeeding unit. Where the first unit has actually demanded the use of the bus assembly, the "who" signal is prevented from being transmitted to the immediately succeeding unit. Thus the bus-requesting unit obtains the right to use the bus assembly and delivers its data to the called unit through the bus assembly. With a data processing system of the above-mentioned arrangement, the CPU and memory unit can be deemed as separate units like the other data processing units, thus enabling the system as a whole to be freely enlarged in capacity.

However, the aforesaid data processing system carries out exchange of data between the respective data processing units including said CPU and memory unit, through a single bus assembly so that exchange of data between said two units sometimes has to be delayed by exchange of data between the other units. The memory unit changes data most frequently with the CPU. If, therefore, such delays occur often, the processing of data by the CPU will be undesirably retarded.

SUMMARY OF THE INVENTION

It is accordingly the object of this invention to provide a data processing system wherein the CPU and memory unit and other units are connected in parallel with a main bus assembly and further at least said CPU and memory unit are connected in parallel with a supplementary bus assembly and, when exchange of data takes place between the other units through a main bus assembly, the CPU and memory unit can exchange data through said supplementary bus assembly independently of the operating condition of the main bus assembly. Namely, where one of the data processing units, for example, the CPU desires to receive data from a core memory, the CPU makes a request for the use of a bus through a supplementary bus assembly even when the main bus assembly is used by any of the other units excluding the memory unit, and supplies the memory unit with a signal representing the address from which data is to be obtained so as to cause the memory unit to deliver the data associated with said address to the CPU through the supplementary bus assembly, thereby effecting the smooth quick exchange of data between both units.

DESCRIPTION OF THE PREFERRED EMBODIMENTS

Figure 1:
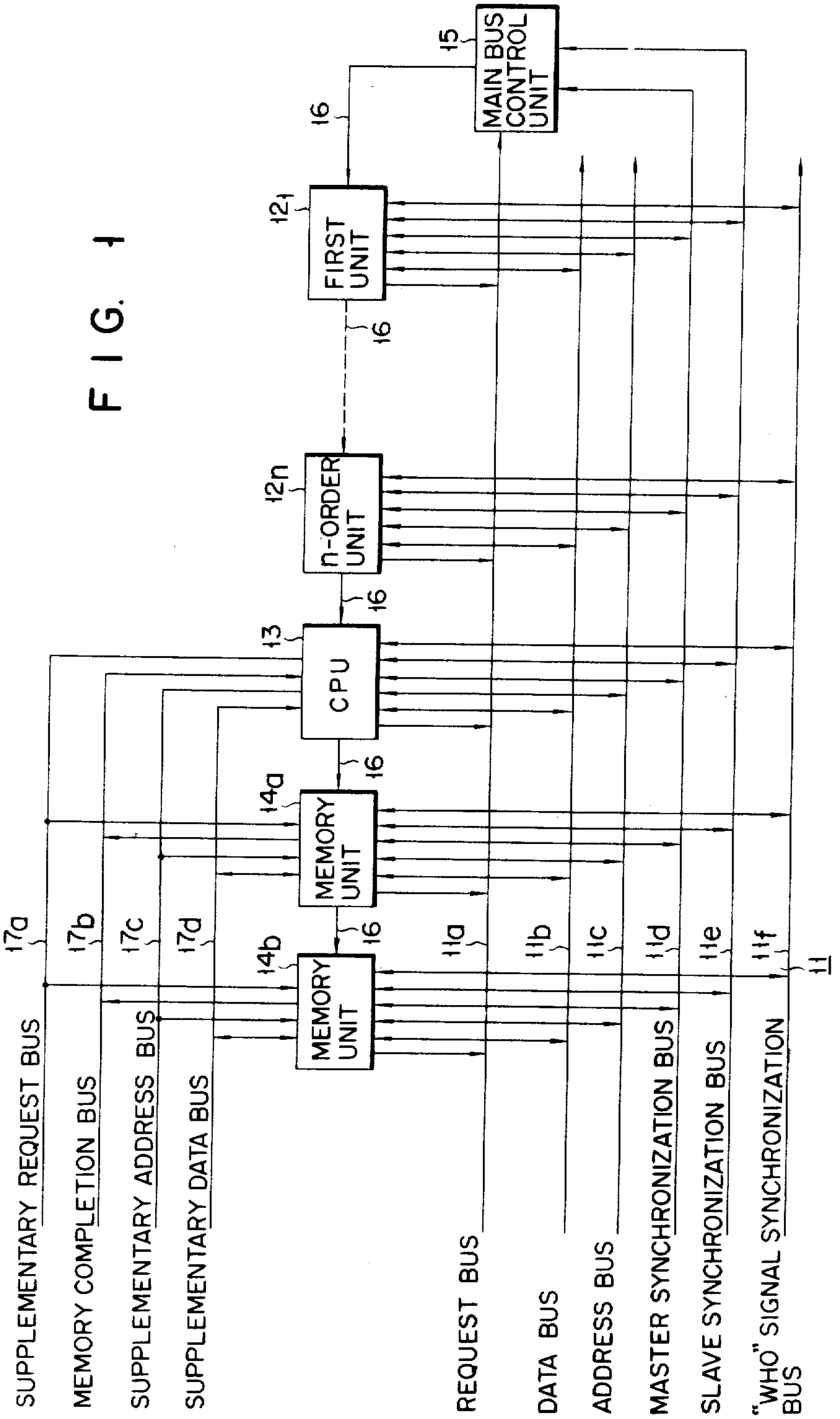
FIG. 1 is a schematic circuit arrangement of a data processing system according to an embodiment of this invention.

Referring to FIG. 1, reference numeral 11 denotes a main bus assembly comprising a request bus 11*a*, data bus 11*b*, address bus 11*c*, master synchronization bus 11*d*, slave synchronization bus 11*e* and "who" signal synchronization bus 11*f*. To these buses 11*a* to 11*f* are connected in parallel first and n-order data processing units $\mathbf{12}_1$ to $\mathbf{12}_n$, CPU 13 and memory units 14*a* and 14*b*. Of the buses 11, the request bus 11*a*, master synchronization bus 11*d* and slave synchronization bus 11*e* are connected to a main bus control unit 15. The bus control unit whose details will be given later, generates a "who" signal when it detects a request for the use of the bus assembly made by the data processing units $12_1$ to $12_n$, CPU 13, and memory units 14*a* and 14*b* to the request bus 11*a*. The "who" signal is transmitted to the first unit $12_1$ through a plurality of signal lines 16 which connect the units $12_1$ to $12_n$, CPU 13 and memory units 14*a* and 14*b* in succession. Where any of the units $12_1$ to $12_n$, CPU 13, and memory units 14*a* and 14*b* does not make its own request for the use of the main bus assembly when supplied, as later described, with the "who" signal, then said "who" signal is transmitted to the immediately following unit. Conversely where any of said units has already requested the use of the main bus assembly when supplied with the "who" signal, then said "who" signal is prevented from being conducted to the immediately succeeding unit. As a result, the bus-requesting unit obtains the right to use the main bus assembly to exchange data with a called unit.

There will now be detailed the construction of the units $12_1$ to $12_n$. Each unit includes a bus interface circuit of FIG. 2 disposed on the master unit side and a bus interface circuit of FIG. 3 provided on the slave unit side. However, the units which can not act as a master unit, such as an interruption unit do not need the bus interface circuit of FIG. 2. Similarly, the units which can not act as a slave unit do not require the bus interface circuit of FIG. 3.

Figure 2:
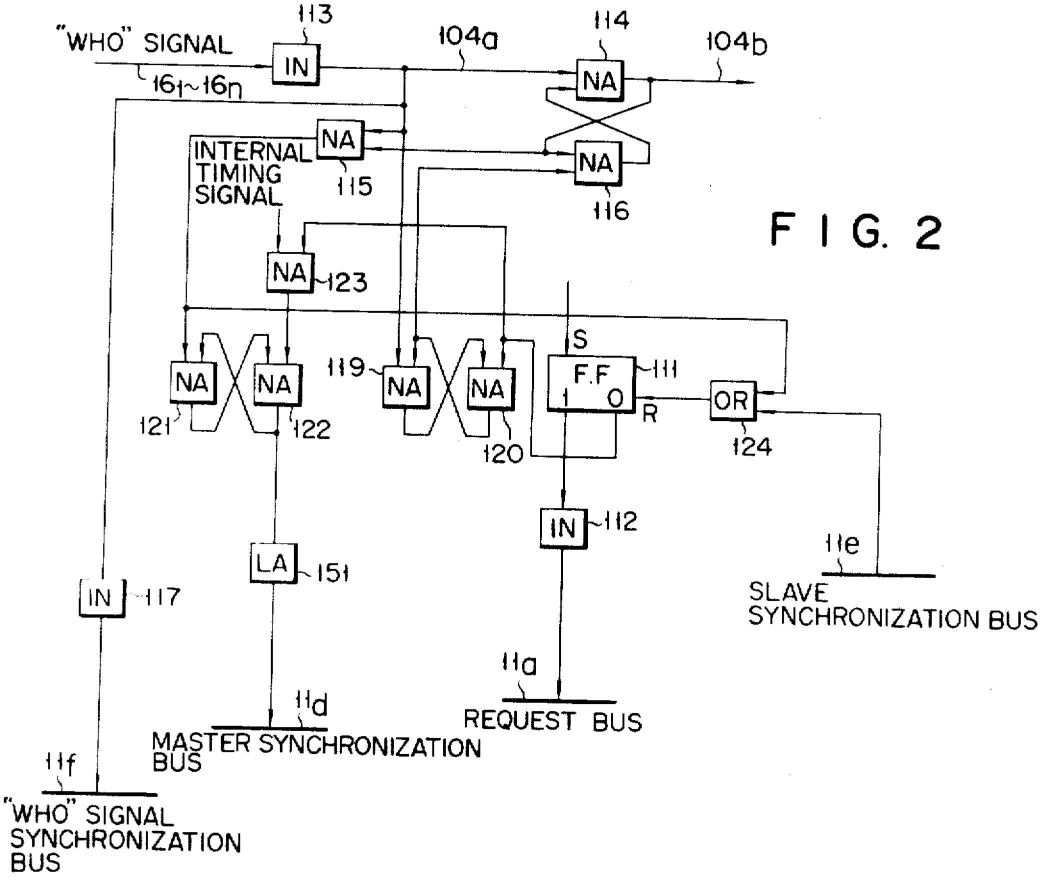
FIG. 2 shows the detailed circuit of a bus-requesting or master unit, particularly the interface circuit thereof.
Figure 3:
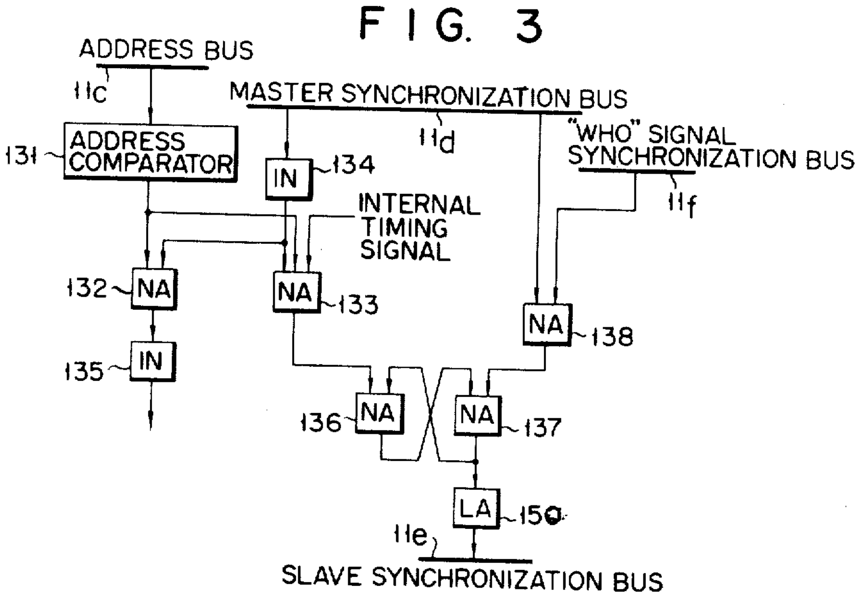
FIG. 3 presents the detailed circuit of a called or slave unit, particularly the interface circuit thereof.

Referring to FIG. 2, reference numeral 111 denotes a flip-flop circuit for causing a unit capable of acting as a master unit to generate a bus-requesting signal. The set terminal of said flip-flop circuit 111 is supplied with a bus-requesting signal from the aforesaid master unit and the output terminal thereof on the "1" side is connected to the request bus 11*a* through an inverter 112. The bus control unit 15 or the preceding signal lines $16_1$ to $16_n$ connected to the units $12_1$ to $12_n$ are connected to one of the input terminals of a NAND gate 114 through an inverter 113 and a signal line 104*a*. The NAND gate 114 allows or obstructs the passage of a "who" signal delivered from any of the preceding signal lines $16_1$ to $16_n$ according to the original function of the units $12_1$ to $12_n$. An output signal from the NAND gate 114 is conducted through a signal line 104*b* to the succeeding element. The output terminal of the NAND gate 114 is connected to one of the input terminals of the other NAND gates 115 and 116 respectively and the output terminal of the NAND gate 116 is connected to the other input terminal of the NAND gate 114.

The signal line 104*a* is connected through an inverter 117 to a "who" signal synchronization bus 11*f*, and also connected to the other input terminal of the NAND gate 115 and one of the input terminals of a NAND gate 119, the output terminal of which is connected to one of the input terminals of a NAND gate 120. The other input terminal of the NAND gate 120 is connected to the output terminal of the flip-flop circuit 111 on the "0" side, and the output terminal of said NAND gate 120 is connected to the other input terminal of the NAND gates 116 and 119 respectively. The output terminal of the NAND gate 115 is connected to one of the input terminals of a NAND gate 121, the output terminal of which is connected to one of the input terminals of a NAND gate 122. The other input terminal of said NAND gate 122 is connected to the output terminal of a NAND gate 123. The output terminal of the NAND gate 122 is connected to one of the input terminals of the NAND gate 121 and the input terminal of a logic amplifier 151. The output terminal of the logic amplifier 121 is connected to the master synchronization bus 11*d*. The NAND gate 123 has one of its input terminals supplied with an internal timing signal and the other input terminal connected to the output terminal of the flip-flop circuit 111 on the "0" side. The term "internal timing signal," as used herein, is defined to mean a timing signal generated characteristically of the subject data processing system. Said internal timing signal denotes "0," while the bus assembly 11 is used, namely, while the system is in operation, and sets the flip-flop circuit 111, and, upon completion of said operation, is turned to "1." The output terminal of the NAND gate 115 and the slave synchronization bus 11*e* are connected through the OR gate 124 to the reset terminal of the flip-flop circuit 111.

There will now be described by reference to FIG. 3 the bus interface circuit facing a slave unit. A unit capable of acting as a slave unit compares its own address with the one received through the address bus 11*c*. An address comparing circuit 131 which generates an output signal at the synchronization of both addresses is connected to the address bus 11*c*. The output terminal of the address comparing circuit 131 is connected to one of the input terminals of a NAND gate 132 and the second input terminal of a NAND gate 133. The other input terminal of the NAND gate 132 and the first input terminal of the NAND gate 133 are connected to the master synchronization bus 11*d*. An output from the NAND gate 132 is delivered through an inverter 135 as a signal for starting the operation of a slave unit. The third input terminal of the NAND gate 133 is supplied with an internal timing signal from the slave unit to control the operation of said gate 133. The internal timing signal represents "0" while the slave unit is in operation, and " 1" while said unit is out of operation.

The output terminal of the NAND gate 133 is connected to one of the input terminals of a NAND gate 136, the output terminal of which is connected to one of the input terminals of the NAND gate 137. The output terminal of the NAND gate 137 is connected to the other input terminal of the NAND gate 136 and the input terminal of the logic amplifier 150. The output terminal of the logic amplifier 150 is connected to the slave synchronization bus 11*e*. The other input terminal of the NAND gate 137 is connected to the output terminal of a NAND gate 138, the two input terminals of which are connected to the master synchronization bus 11*d* and "who" signal bus 11*f* respectively.

Figure 4:
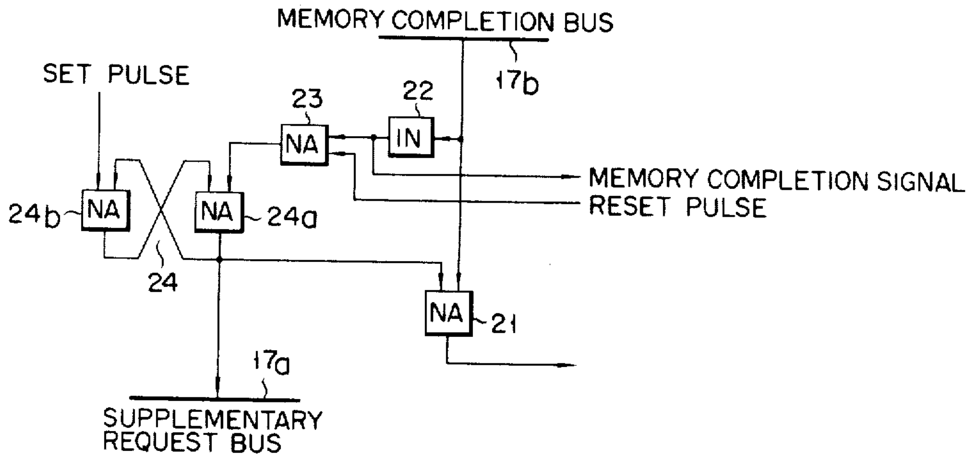
FIG. 4 indicates the detailed circuit of the CPU, particularly the interface circuit thereof.
Figure 5:
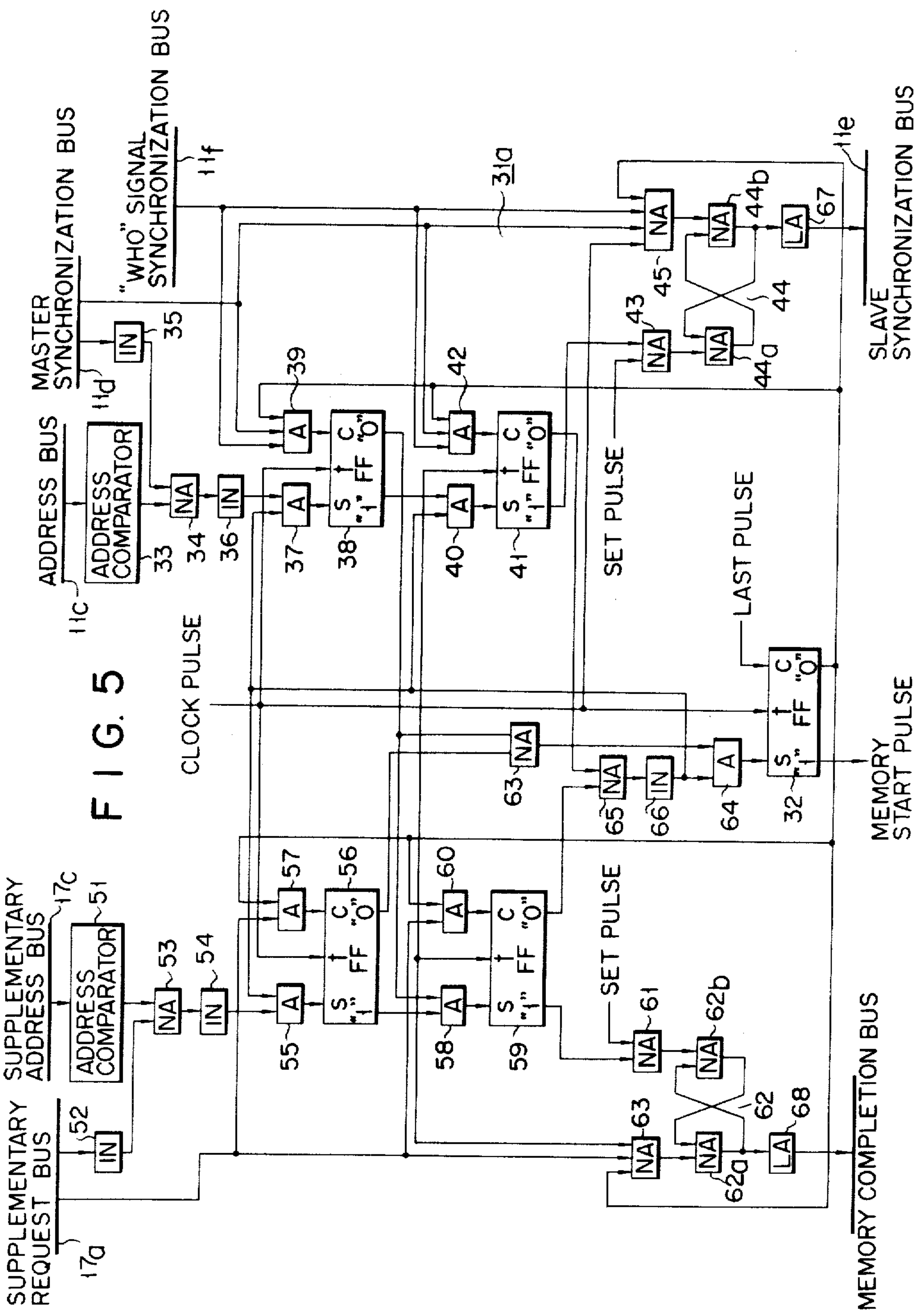
FIG. 5 shows the detailed circuit of a memory unit, particularly the interface circuit thereof.

Further, the CPU and memory units 14*a* and 14*b* are collectively provided, as shown in FIG. 1, with a supplementary bus assembly including a supplementary request bus 18*a*, memory completion bus 17*b*, supplementary address bus 17*c* and supplementary data bus 17*d*, thereby enabling change of data between the CPU 13 and either of the memory units 14*a* and 14*b* to be effected not only through the main bus assembly 11 but also through the supplementary bus assembly 17. Namely, the CPU 13 uses the supplementary bus assembly 17 only during a fetch cycle and also when collation has to be made during an execute cycle with the data stored in the memory units 14*a* and 14*b*. FIGS. 4 and 5 respectively present the interface circuit of the CPU 13 and that of the memory units 14a and 14b.

There will now be described the interface circuit (FIG. 4) of the CPU 13 facing the supplementary bus assembly. The memory completion bus 17b constituting part of the supplementary bus assembly 17 is connected to a second input terminal of a NAND gate 21 and also to a first input terminal of a NAND gate 23 through an inverter 22, the output terminal of which is delivered as a signal showing the completion of memory. A second input terminal of the NAND gate 23 is supplied with a reset signal. The output terminal of the NAND gate 23 is connected to a second input terminal of one NAND gate 24a constituting one component of a flip-flop circuit 24 for generating a bus-requesting signal. A first input terminal of the NAND gate 24a is connected to the output terminal of the other NAND gate 24b forming another component of said flip-flop circuit 24. The output terminal of the NAND gate 24a is connected to a second input terminal of said other NAND gate 24b. A first input terminal of the NAND gate 24b is supplied with a set signal. The output terminal of the NAND gate 24a is connected to the supplementary request bus 17a and also to a first input terminal of the NAND gate 21. The NAND gate 21 gives forth a signal showing that the CPU 13 requests the use of the bus assembly due to the desire to receive data from either of the memory units 14a and 14b. Under the above-mentioned arrangement, a set signal conducted to the NAND gate 24b of the flip-flop circuit 24 continues to have a potential of "0" for a prescribed length of time to set the flip-flop circuit 24. As a result, the supplementary request bus 17a is supplied with a bus-requesting signal to change the potential of said bus 17a to "0." When the memory completion bus 17b has a potential of "0," a reset signal supplied to the second input terminal of the NAND gate 23 retains a potential of "1" for a prescribed length of time, to reset the flip-flop circuit 24.

The interface circuit of the CPU 13 facing the main bus assembly is of the same arrangement as those of the data processing units $12_1$ to $12_n$, description thereof being omitted.

There will now be described the interface (FIG. 5) of the memory units 14a and 14b respectively. The interface is divided into two portions, that is, a main bus interface circuit 31a and a supplementary bus interface circuit 31b. A memory start flip-flop circuit 32 is set by either of the main or supplementary interface circuit 31a or 31b. There will now be described the arrangement of the main interface circuit 31a. The address bus 11c is connected to an address comparing circuit 33, which detects its own address from among the address signals supplied through the address bus 11c. The output terminal of the address comparing circuit 33 is connected to a first input terminal of a NAND gate 34. A second input terminal of the NAND gate 34 is connected through an inverter 35 to the master synchronization bus 11d. The output terminal of the NAND gate 34 is connected through an inverter 36 to a second input terminal of an AND gate 37. The output terminal of the AND gate 37 is connected to the set terminal S of a flip-flop circuit 38 for storing a bus-requesting signal. The clear terminal C of the flip-flop circuit 38 is connected through an AND gate 39 to the "who" signal synchronization bus 11f, master synchronization bus 11d, and the "0" side output terminal of the flip-flop circuit 32. The "1" side output terminal of the flip-flop circuit 38 is connected to a second input terminal of an AND gate 40, the output terminal of which is connected to the set terminal S of a flip-flop circuit for indicating the operating condition of the main bus assembly 11. To the clear terminal C of the flip-flop circuit 41 are connected through an AND gate 42 the "who" signal synchronization bus 11f, master synchronization bus 11d, and the "0" side output terminal of the flip-flop circuit 32. The "0" side output terminal of the flip-flop circuit 41 is connected to a second input terminal of a NAND gate 43, a first input terminal of which is supplied with a set signal. The output terminal of the NAND gate 43 is connected to a first input terminal of one NAND gate 44a constituting one component of a flip-flop circuit 44. A second input terminal of the other NAND gate 44b forming another component of the flip-flop circuit 44 is connected to the output terminal of a NAND gate 45 which is supplied with a clock pulse as well as with signals from the master synchronization bus 11d, "who" signal synchronization bus 11f and the "0" side output terminal of the flip-flop circuit 32. The output terminal of the flip-flop circuit 44 facing the NAND gate 44b is connected to the slave synchronization bus 11c through a logic amplifier 67. The output terminal of the NAND gate 44a is connected to a first input terminal of the NAND gate 44b and the output terminal of the NAND gate 44b to a second input terminal of the NAND gate 44a. The timing pulse input terminals of the flip-flop circuits 88 and 41 are supplied with a clock pulse.

There will now be described the interface circuit 31b of the supplementary bus assembly. The supplementary address bus 17c is connected to an address comparing circuit 51 which detects an address signal conducted through the supplementary address bus 17c by comparing said address with its own address. The request bus 17a is connected through an inverter 52 to a first input terminal of a NAND gate 53. The output terminal of the address comparing circuit 51 is connected to a second input terminal of a NAND gate 53, the output terminal of which is connected through an inverter 54 to a first input terminal of an AND gate 55. The output terminal of the AND gate 55 is connected to the set terminal of a flip-flop circuit 56 for storing a bus-requesting signal. The clear terminal C of the flip-flop circuit 56 is connected through an AND gate 57 to the supplementary request bus 17a and the "0" side output terminal of the flip-flop circuit 32. The timing pulse input terminal of the flip-flop circuit 56 is supplied with a clock pulse. The "1" side output terminal of the flip-flop circuit 56 and the "0" side output terminal of the flip-flop circuit 38 included in the interface circuit 31a of the main bus assembly are connected through an AND gate 58 to the set terminal S of a flip-flop circuit 59 for indicating the operating condition of the supplementary bus assembly 17. To the clear terminal C of the flip-flop circuit 59 are connected through an AND gate 60 the request bus 17a and the "0" side output of the flip-flop circuit 32, the timing pulse input terminal t of which is supplied with a clock pulse. The "1" side output terminal of the flip-flop circuit 59 is connected to a first input terminal of a NAND gate 61, a second input terminal of which is supplied with a set signal. The output terminal of the NAND gate 61 is connected to a second input terminal of one NAND gate 62b constituting one component of a flip-flop circuit 62. A first input terminal of the other NAND gate 62$a$ constituting another component of said flip-flop circuit 62 is connected through a NAND gate 63 to the "0" side output of the flip-flop circuit 32, supplementary request bus 17$a$ and also supplied with a clock pulse. The output terminal of the flip-flop circuit 62 facing the NAND gate 62$a$ is connected through a logic amplifier 68 to the memory completion bus 17$b$. The output terminal of the NAND gate 62$a$ is connected to a first input terminal of the NAND gate 62$b$ and the output terminal of the NAND gate 62$b$ is connected to a second input terminal of the NAND gate 62$a$. The output "0" side output terminals of the flip-flop circuits 38 and 56 are connected to a second and a first input terminal respectively of the NAND gate 63, the output terminal of which is connected to a second input terminal of a NAND gate 64. The "0" side output terminals of the flip-flop circuits 41 and 59 are connected to a first and a second input terminal respectively of a NAND gate 65, the output terminal of which is connected through an inverter 66 to a first input terminal of the NAND gate 64. The output terminal of the inverter 66 is connected to the first input terminal of the NAND gate 37, the first input terminal of the NAND gate 40 and the second input terminal of the NAND gate 55 respectively. The clear terminal C of the flip-flop circuit 32 is supplied with the last pulse and the timing signal input terminal thereof is supplied with a clock pulse. The flip-flop circuit produces a memory start signal from its "1" side output terminal.

Generally, the CPU most frequently requires data to be supplied from the memory unit, so that the circuit arrangement of FIG. 5 gives the highest priority to the interface circuit 31$a$ facing the main bus assembly by the known means (not shown).

Figure 6:
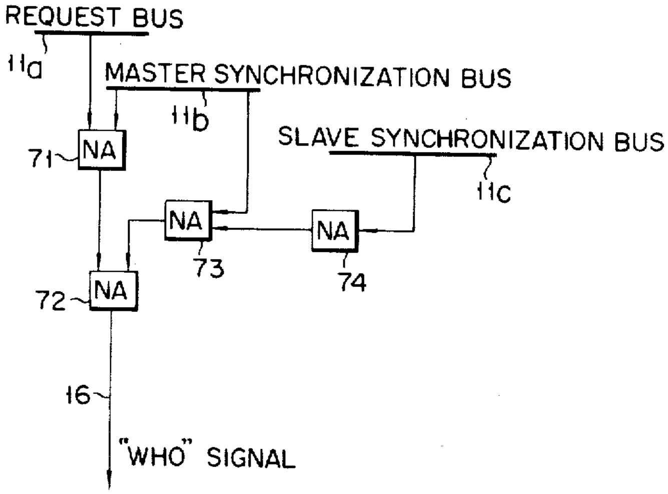
FIG. 6 presents a detailed circuit of a bus control unit.

FIG. 6 shows the detailed circuit of the main bus control unit 15. The request bus 11$a$ and master synchronization bus 11$d$ are connected to the different input terminals of a NAND gate 71, the output terminal of which is connected to a first input terminal of a NAND gate 72. A first input terminal of a NAND gate 73 is connected to the master synchronization bus 11$d$ and a second input terminal thereof is connected through an inverter 74 to the slave synchronization bus 13$e$. The output terminal of the NAND gate 73 is connected to a second input terminal of the NAND gate 72 whose output signal is conducted as "who" signal to the first data processing unit $\mathbf{12}_1$ through a signal line 16.

There will now be described the operation of the main bus side of the data processing system of this embodiment arranged as described above. Where no exchange of data takes place, the buses 11$a$ to 11$e$ are kept at positive potential. Namely, where any of the units $\mathbf{12}_1$ to $\mathbf{12}_n$ does not request the use of the bus assembly 11, then the flip-flop circuit 111 of a master unit is in a reset condition. A "0" signal delivered from the output terminal of said flip-flop circuit 111 on the "1" side is inverted to a "1" signal through the inverter 112 and supplied to the request bus 11$a$ to keep it in a state of "1," namely, a state of positive potential. The "who" signal lines $\mathbf{16}_1$ to $\mathbf{16}_n$ are also normally in a state of "1," namely, a state of positive potential. The "1" signal is inverted to a "0" signal through the inverter 113 and supplied to the input terminal of the NAND gate 114 through the signal line 104$a$. Accordingly, the signal line 104$b$ through which there is transmitted a "who" signal to the succeeding unit is kept in a state of "1," namely, a state of positive potential. While the flip-flop circuit 111 is reset, the internal timing signal denotes "1." Therefore, the NAND gate 123 produces an output signal of "0" and the output terminal of the flip-flop circuit 111 on the "0" side generates an output signal of "1." Accordingly, a "1" signal from the NAND gate 122 is supplied to the master synchronization bus 11$d$ to keep it in a state of positive potential. While the signal line 16$a$ is in a state of "0," the inverter 117 produces a signal of "1" and the "who" signal synchronization bus 11$f$ is in a state of "1," namely, a state of positive potential.

Where any of the units $\mathbf{12}_1$ to $\mathbf{12}_n$ requests the use of the bus assembly 11, said unit gives forth a signal requesting the use of the bus assembly 11, causing the flip-flop circuit 111 to be supplied with a set signal. When said circuit 111 is set, a "1" signal is delivered from its output terminal on the "1" side. Then the inverter produces an output signal of "0" to bring the request bus 11$a$ to a state of "0," thereby notifying the bus control unit that the use of the bus assembly 11 is now requested. When the request bus 11$a$ has a potential of "0," the bus control unit of FIG. 6 causes the NAND gate 71 to produce an output signal of "1." At this time, the slave synchronization bus 11$c$ has a potential of "1," and the inverter 74 generates an output signal of "0." As the result, the NAND gate 73 produces an output signal of "1" and in consequence the NAND gate 72 gives forth an output signal of "0," which is conducted to the first unit $\mathbf{12}_1$ as a "who" signal.

Upon generation of the "who" signal, the signal line $\mathbf{16}_1$ of FIG. 2 has a potential of "0," causing the inverter 113 to produce an output signal of "1." If, under this condition, the first unit $\mathbf{12}_1$ has no request to use the bus assembly 11, namely, the flip-flop circuit 111 is not set, then the output terminal of said circuit 111 on the "0" side produces an output signal of "1" and the NAND gate 119 also generates an output signal of "1." Accordingly, the NAND gate 120 receives forth an output signal of "0," so that the input terminal of the NAND gate 114 is supplied with a "1" signal through the NAND gate 116. When the NAND gate 114 is thus supplied with an input, the signal line 104$b$ has a potential of "0," allowing the aforesaid "who" signal to be transmitted to the succeeding unit $\mathbf{12}_2$.

If, however, the first unit $\mathbf{12}_2$ requests the use of the bus assembly 11, namely, the flip-flop circuit 111 is set, then its output terminal on the "0" side gives forth an output signal of "0," causing the NAND gate to produce an output signal of "1." On the other hand, the NAND gate 114 initially produced an output signal of "1" and consequently the NAND gate 116 an output signal of "0." Accordingly, the signal line 104$b$ is kept in a potential of "1," preventing the "who" signal supplied to the signal line 104$a$ from being further transmitted to the following unit $\mathbf{12}_2$.

While the flip-flop circuit 111 is set, both signal lines have a potential of "1." Therefore, the NAND gate 115 produces an output of "0," and the NAND gate 121 an output of "1." At this time, the flip-flop circuit 111 generates an output signal of "0" from its output terminal on the "0" side. Accordingly, the NAND gate 123 produces an output signal of "1" and the NAND gate 122 an output of "0." The logic amplifier 151 gives forth an output signal of "0" which is supplied to the master synchronization bus 11$d$. When the master synchronization bus 11$d$ has a potential of "0," this condition is detected by a detector (not shown) and the master unit supplies the address bus 11$c$ with the address of a responding unit. As a result, the data bus 11$b$ is supplied with the data being transmitted. Where, however, the responding unit has its function determined simply by designation of its address, such transmission of data may be omitted. Where the signal line 104$a$ has a state of "1" potential, then inverter 117 produces an output signal of "0" to supply a "0" signal to the "who" signal synchronization bus 11$f$.

When the master synchronization bus 11$d$ has a potential of "0," then the inverter 134 of the slave unit shown in FIG. 3 generates an output signal of "1." The address-comparing circuit always compares its own address with the one supplied from the master unit to the address bus 11$c$, and gives forth an output signal of "1" where both addresses synchronize with each other. When a signal of "1" is delivered from the address-comparing circuit 131, the NAND gate 132 produces an output signal of "0," and the inverter 135 an output of "1," thereby supplying a start signal to the slave unit. As the result, the slave unit commences to receive the data delivered from the master unit to the data bus 11$b$. Where said slave unit has any data to be sent back to the master unit, said data is supplied to the data bus 11$b$. When the slave data completes its operation, the internal timing signal previously supplied to the third input terminal of the NAND gate 133 is changed from "0" to "1." Thus, the NAND gate 133 generates an output signal of "0," and the NAND gate 136 an output signal of "1." Since, at this time, the master synchronization bus 11$d$ has a potential of "0," the NAND gate 138 gives forth an output signal of "1," and the NAND gate 137 an output signal of "0," supplying the slave synchronization bus 11$e$ with a slave synchronization signal.

When supplied with said slave synchronization signal the NAND gate 115 of the master unit of FIG. 2 produces an output signal of "0," and the slave synchronization bus 11$e$ has a potential of "0." Accordingly, the OR gate 124 gives forth an output signal of "0" to reset the flip-flop circuit 111. When reset, said circuit 111 generates an output signal of "1" from its output terminal on the "0" side, causing one of the input terminals of the NAND gate 123 to be supplied with a "0" signal. At this time, the internal timing signal still remains to be "0" and the NAND gate produces an output signal of "1." When the master unit completes its operation including the receipt of the data delivered from the slave unit to the data bus 11$b$, then the internal timing signal is changed to "1," the NAND gate 123 generates an output signal of "0" and the NAND gate 122 an output signal of "1." Therefore, the master synchronization signal supplied to the master synchronization bus 11$d$ which has now been changed to "1" is prevented from being further transmitted to any other part of the data processing system.

In the bus control unit 15 of FIG. 6, the master synchronization bus 11$d$ has a potential of "1" and the slave synchronization bus 11$c$ a potential of "0" and the inverter 74 produces an output signal of "1." Accordingly, the NAND gate 73 gives forth an output signal of "0" and the NAND gate 72 an output signal of "1" to prevent the "who" signal from being further transmitted. The shutoff of the "who" signal means that said "who" signal ceases to be supplied to any of the units $\mathbf{12}_1$ to $\mathbf{12}_n$ through the inverter 113 and NAND gate 114 of FIG. 2. At this time, the "who" signal synchronization bus 11$f$ has a potential of "1." Accordingly, the NAND gate 138 of FIG. 3 generates an output signal "0," because the master synchronization bus 11$d$ has a potential of "1," thereby preventing the generation of a slave synchronization signal. When said slave synchronization signal ceases to be produced, the inverter 74 of FIG. 6 gives forth an output signal of "0" and the NAND gate 73 an output signal of "1" and the "who" signal remains to be "1," thus rendering the data processing system ready to meet the succeeding request for the use of the bus assembly 11.

The foregoing description refers to the case where exchange of data takes place through the main bus assembly 11. There will now be described the case where the CPU exchanges data with either of the memory units 14$a$ and 14$b$ through the supplementary bus assembly 17. In this case, the address of the called memory unit is delivered to the supplementary address bus 17$c$. The flip-flop circuit 24 included in the interface circuit of the CPU 13 of FIG. 4 is set to cause the NAND gate 24$a$ to have a potential of "0." The resulting request signal changes the potential of the supplementary request bus 17$a$ to "0." If, in this case, it is necessary to store any data in the memory unit, said data is also supplied to the supplementary data bus 17$d$. When the flip-flop circuit 24 is set, the NAND gate 24$a$ produces an output of "0." Accordingly, the NAND gate 21 generates an output of "1," indicating that the CPU 13 is requesting the use of the supplementary bus assembly 17 to receive data from the memory unit. While there is given forth a signal demanding the supply of data from the memory unit, the CPU is prevented from generating such signal in succession as is the case with an ordinary data processing system.

Where the CPU 13 supplies a request for the use of the supplementary bus assembly 17 to the supplementary request bus 17$a$, the interface circuit of the memory unit detects said request and commences operation. If, in this case, either of the memory units 14$a$ and 14$b$ receives a request for supply of data from the CPU 13 alone, the interface circuit 31$b$ of the supplementary bus assembly 17 is actuated to set the flip-flop circuit 32, thereby starting the memory unit 14$a$ or 14$b$. Where, however, the memory unit receives a request for supply of data not only from the CPU 13 but also from any of the other data processing units $\mathbf{12}_1$ to $\mathbf{12}_n$, the interface circuit 31$a$ of the main bus assembly 11 is preferentially operated.

Figure 9:
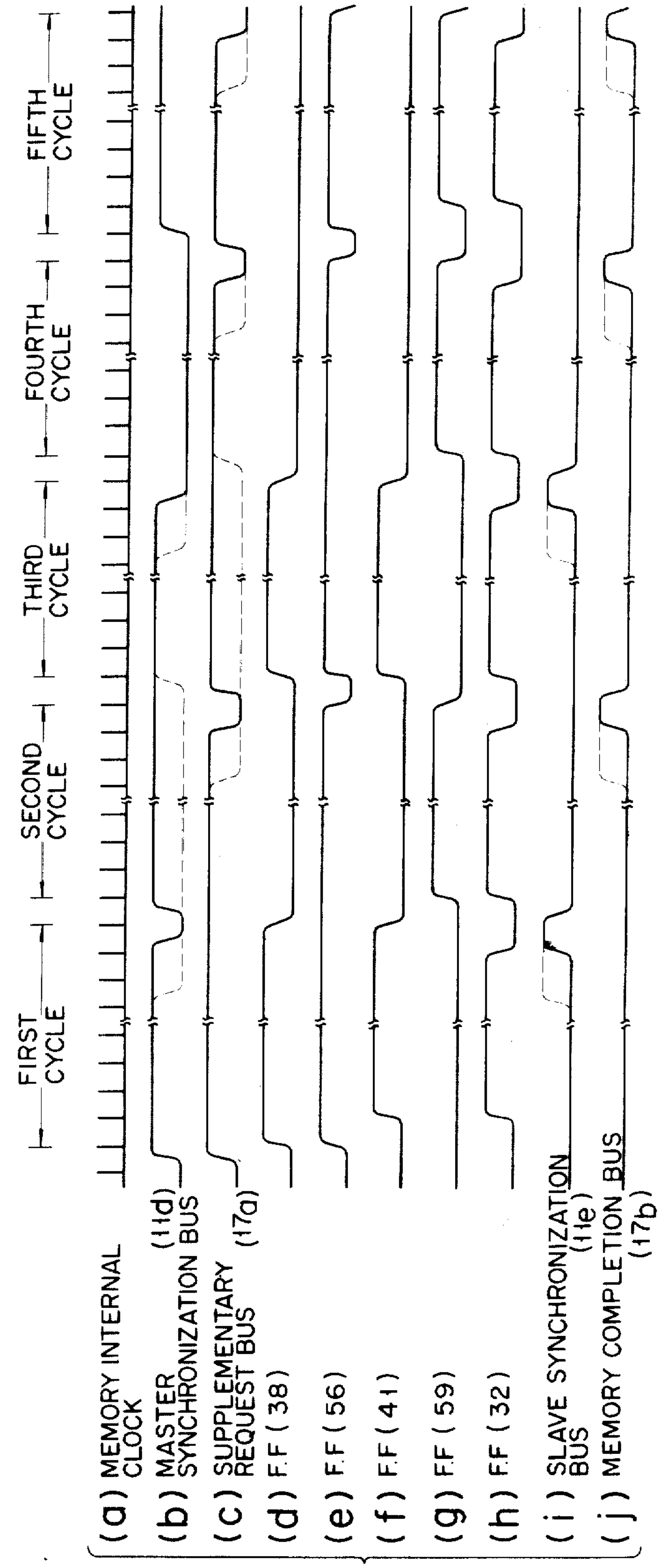
FIG. 9 is a timing chart illustrating the operation of the first embodiment of FIG. 1.

There will now be described by reference to FIG. 9 the manner in which there is made a request for the use of the main bus assembly 11 and supplementary bus assembly 17. The first cycle of FIG. 9 denotes the case where there are simultaneously made requests for the use of the main bus assembly 11 and supplementary bus assembly 17. Where the main request bus 11$a$ and supplementary request bus 17$a$ have a potential of "0" upon receipt of the aforesaid requests, then the address comparing circuits 33 and 51 compare the addresses delivered to the address buses 11$c$ and 17$c$ with their own addresses. When the address comparing circuits 33 and 51 produce an output of "1" as the result of said comparison, then the NAND gates 34 and 53 generate an output of "0." These "0" output signals are inverted to "1" signals by the inverters 36 and 54 to be supplied to one input terminal of the NAND gates 37 and 55 respectively. Since, at this time, the flip-flop circuits 41 and 59 are in a reset state, the NAND gate 65 produces an output of "0" and the other input terminal of the aforesaid NAND gates 37 and 55 respectively is supplied with a signal of "1" through the inverter 66. As a result, said NAND gates 37 and 55 generate an output of "1." The flip-flop circuits 38 and 56 are set in synchronization with a clock pulse delivered upon detection of a data requesting signal, and are stored with information indicating that there was made a request for the use of the main bus assembly 11 and supplementary bus assembly. Upon arrival of the succeeding clock pulse, determination is made of the priority of both bus assemblies. If the main bus assembly has a higher priority, the flip-flop circuit 41 is supplied with a signal of "1" through the NAND gate 40 to be set. At this time, the flip-flop circuit 38 is set to cause the NAND gate 63 to produce an output of "1." As a result, the NAND gate 64 generates an output of "1" to set the flip-flop circuit 32. When the flip-flop circuit 32 is thus set, either of the memory units 14*a* and 14*b* is put into operation by a signal delivered from the "1" side output terminal of said flip-flop circuit 32 to receive an address-specifying signal from the address bus 11*c* according to the internal timing of said memory. Whether the address bus 11*c* or 17 *c* receives data depends on whether the flip-flop circuit 41 or 59 is set. The address buses 11*c* and 17*c* may be supplied with data associated with the operation mode. If said mode relates to the writing of data in the memory unit 14*a* or 14*b*, the address buses 11*c* and 17*c* receive required data from the data bus 11*b* where necessary. Where the mode relates to the delivery of data from the memory unit 14*a* or 14*b*, there is generated a set pulse, as shown in a broken line in FIG. 9, upon completion of the delivery to set the flip-flop circuit 44 through the NAND gate 43, changing the potential of the slave synchronization bus 11*c* to "0." Upon generation of a slave synchronization signal, a unit acting as a master unit receives data from the data bus 11*b* to change the potential of the master synchronization bus 11*d* to "1." Upon completion of a cycle in the memory unit 14*a* or 14*b*, the flip-flop circuit 32 is supplied with the last pulse according to the internal timing of the memory so as to be cleared. Even when the aforesaid mode is concerned with the writing of data, the flip-flop circuit 44 is set either by the last pulse or by a set pulse before generation of said last pulse to change the potential of the slave synchronization bus 11*e* to "0." The set pulse should be generated simultaneously with the last pulse at the latest. Later when the master synchronization bus 11*d* has a potential of "1," the initial clock pulse supplied clears the flip-flop circuits 38 and 41 to restore the potential of the slave synchronization bus 11*e* to "1," thereby completing the first cycle.

Under this condition the flip-flop circuit 56 remains set. Therefore, even when the master synchronization bus 11*d* has its potential changed to "0" immediately after the first cycle or after completion of the second cycle, the interface circuit 31*b* of the supplementary bus assembly 17 is actuated to permit exchange of data between the CPU 13 and either of the memory units 14*a* and 14*b* through said supplementary bus assembly 17. In the second cycle, the interface circuit 31*b* of the supplementary bus assembly 17 is actuated.

Figure 7:
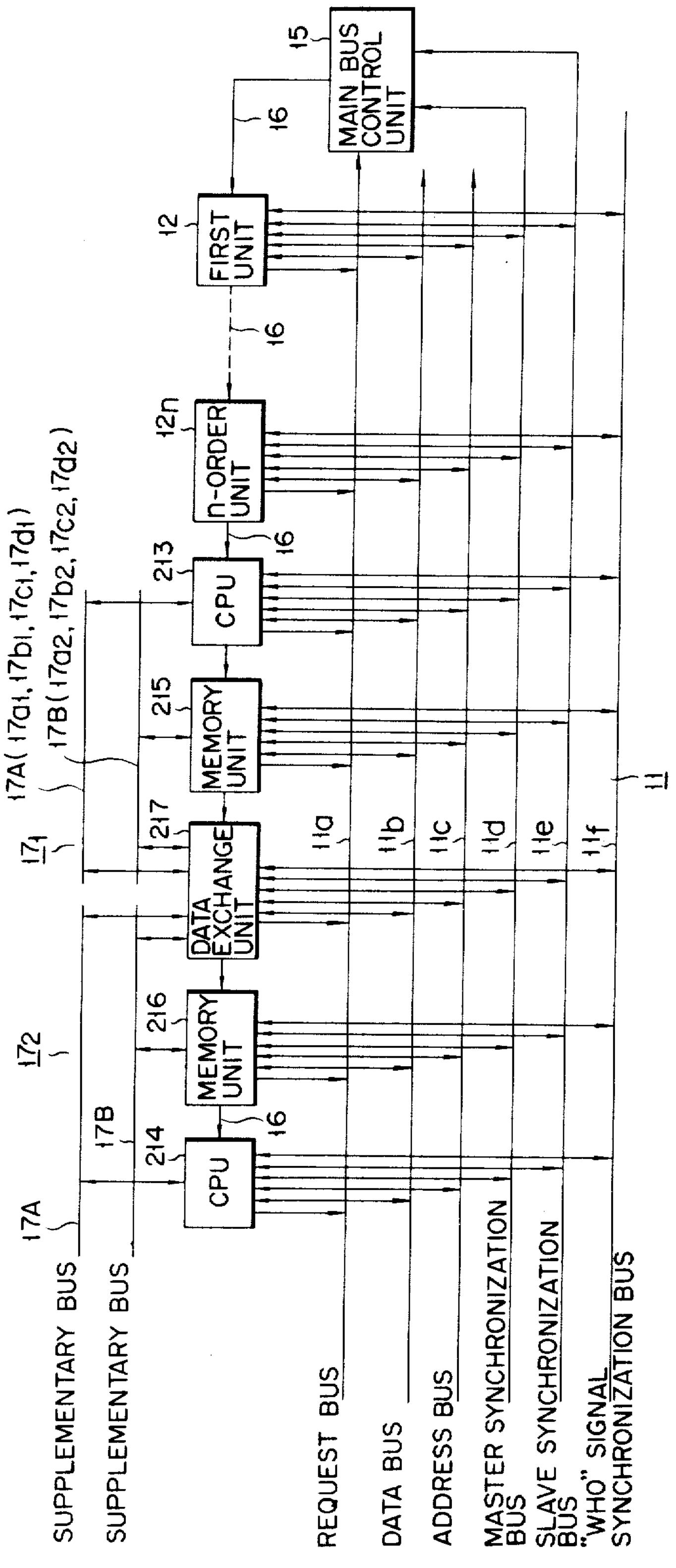
FIG. 7 is a schematic circuit arrangement of a data processing system according to another embodiment of the invention.

According to the second embodiment of FIG. 7, a request is made to exchange data through both main bus assembly 11 and supplementary bus assembly 17 before generation of a clock pulse upon completion of the second cycle. Therefore, data is exchanged through the main bus assembly 11 in the third cycle and through the supplementary bus assembly 17 in the fourth cycle. Since a request for the use of the supplementary bus assembly 17 takes place during a period between the generation of the succeeding clock pulse and the completion of the fourth cycle, data is exchanged through the supplementary bus assembly 17 in the fifth cycle.

When the interface circuit 31*b* of the supplementary bus assembly 17 is actuated and a set pulse is generated upon completion of the operation of the memory unit 14*a* or 14*b* to set the flip-flop circuit 62 through the NAND gate 61, then the memory completion bus 17*b* is supplied with a memory completion signal. When the memory completion bus 17*b* has a potential of "0," the interface circuit of FIG. 4 confirms the memory completion when the inverter 22 generates an output of "1."

Where there are made requests to exchange data through the main bus assembly 11 and supplementary bus assembly 17 during an intervening period between the generation of one pulse and that of another, preference is given to the use of the main bus assembly 11. When the aforesaid requests are made immediately before and after the generation of a clock pulse, preference is given to either of the requests which has been made ahead of the other. Further where the requests are made simultaneously with the generation of a clock pulse, the priority of said requests is determined by whether either or both of the flip-flop circuits 38 and 56 are set at that moment or by the succeeding clock pulse.

While any of the first and *n*-order units $12_1$ to $12_n$ uses the main bus assembly 11, the CPU 13 can exchange data with the memory unit 14*a* or 14*b*, as previously described, through the supplementary bus assembly 17.

There will now be described by reference to FIG. 7 a data processing system according to a second embodiment of this invention. The parts of FIG. 7 the same as those of the first embodiment are denoted by the same numerals, description thereof being omitted. Reference numeral 11 represents a main bus assembly which, as in the first embodiment, includes a request bus 11*a*, data bus 11*b*, address bus 11*c*, master synchronization bus 11*d*, slave synchronization bus 11*e* and "who" signal synchronization bus 11*f*. To these buses 11*a* to 11*f* are connected in parallel the first to *n*-order units $12_1$ to $12_n$ attached to an electronic computer, CPU 213 and 214, memory units 215 and 216 and data exchange unit 217. The data exchange unit 217 may comprise of a midget electronic computer. Of the main bus assembly 11, the request bus 11*a*, master synchronization bus 11*d* and slave synchronization bus 11*e* are connected to the bus control unit 15, which is of the same type as in the first embodiment and is designed to detect a request for the use of the main bus assembly 11 delivered to the request bus 11*a* from any of the data processing units $12_1$ to $12_n$, CPU 213 and 214, memory units 215 and 216 and data exchange unit 217 and generate a "who" signal. The "who" signal is transmitted to the first unit $12_1$ through a signal line 16, and then to the succeeding units in turn according to their operating conditions. Namely, where any of the data processing units $12_1$ to $12_n$, CPU 213 and 214, memory units 215 and 216 and data exchange unit 217 does not make its own request for the use of the main bus assembly 11 when supplied with the "who" signal, then said "who" signal is transmitted to the immediately following unit. Conversely, where any of the aforesaid units requires the use of the main bus assembly 11 for itself, the "who" signal is prevented from being transferred to the immediately following unit. The bus assembly-requesting unit obtains the right to use the assembly and exchanges data with a called unit. Between the CPU 213 and memory unit 215 as well as between the CPU 214 and memory unit 216 are provided supplementary bus assemblies 171 and 172. These supplementary bus assemblies 171 and 172 are connected to the data exchange unit 217 and respectively include a supplementary bus assembly 17A connecting the CPU 213 and 214 and data exchange unit 217 and a supplementary bus assembly 17B connecting the memory units 215 and 216 and data exchange unit 217. Further, the supplementary bus assembly 17A is formed of a supplementary request bus $17a_1$, supplementary memory completion bus $17b_1$, supplementary address bus $17c_1$ and supplementary data bus $17d_1$, while the supplementary bus assembly 17B includes a supplementary request bus $17a_2$, supplementary memory completion bus $17b_2$, supplementary address bus $17c_2$ and supplementary data bus $17d_2$. The supplementary bus assemblies 17A and 17B have the same arrangement as the supplementary bus assembly 17 of FIG. 1, indication thereof being omitted. While the CPU 213 and 214 can exchange data with the memory units 215 and 216 through the data exchange unit 217 not only through the main bus assembly 11, but also the supplementary bus assemblies 171 and 172, these supplementary bus assemblies 171 and 172 are only used when the CPU 213 and 214 require reference to the data of the memory units 215 and 216 during the fetch and execute cycles of command. The data exchange unit 217 permits exchange of data between the memory units 215 and 216 connected to the supplementary bus assemblies 171 and 172 respectively.

There will now be described the interface circuits associated with the respective buses. The interface circuits of the CPU 213 and 214 facing the supplementary bus assemblies have the same arrangement as that of FIG. 4, description thereof being omitted. The interface circuits of the memory units 215 and 216 have the same arrangement as that of FIG. 5, description thereof being omitted.

Figure 8:
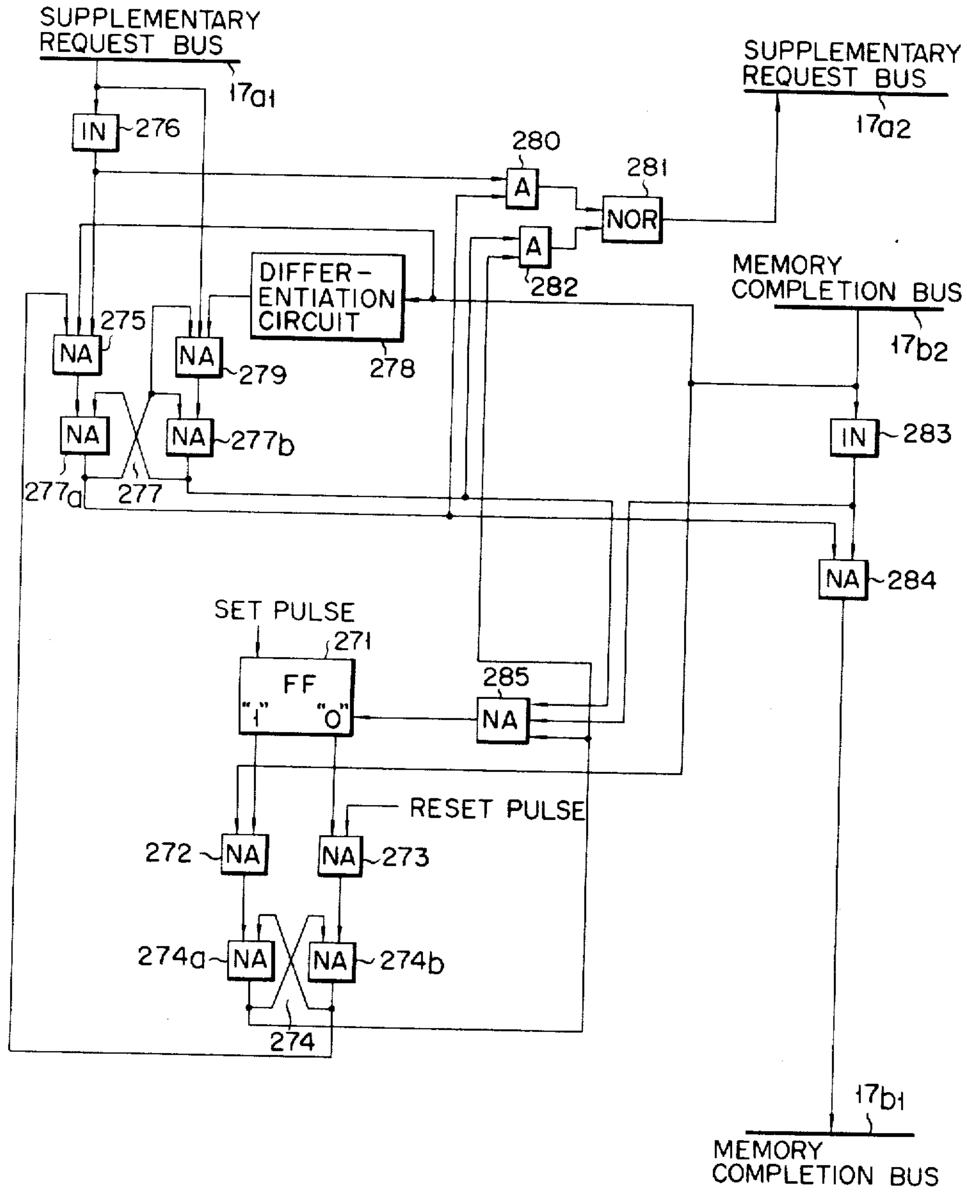
FIG. 8 indicates the detailed circuit of a data processing unit, particularly the interface circuit thereof.

FIG. 8 presents part of an interface circuit provided for each of the supplementary bus assemblies 171 and 172 attached to the data exchange unit 217. The supplementary request bus $17a_2$ and memory completion bus $17b_2$ connect the data exchange unit 217 and the memory unit 215 or 216. The memory completion bus $17b_1$ connects the data exchange unit 217 and the CPU 213 or 214. Reference numeral 271 denotes a flip-flop circuit for generating a signal requesting the supply of data from the memory unit. The flip-flop circuit 271 is set by a set pulse when the data exchange unit 217 demands the memory unit to deliver data. The "1" side output terminal and "0" side output terminal of the flip-flop circuit 271 are connected to one input terminal of NAND gates 272 and 273. The other input terminal of the NAND gate 272 is connected to the memory completion bus $17b_2$. The other input terminal of the NAND gate 273 is supplied with a reset signal which is generated when the data exchange unit 217 receives data from the memory unit and a signal requesting the supply of data from said memory unit has to be cleared. The output terminal of the NAND gate 272 is connected to the set signal input terminal of the NAND gate 274a of a flip-flop circuit 274 which has said NAND gate 274a and another NAND gate 274b. The output terminal of the NAND gate 273 is connected to the reset signal input terminal of the NAND gate 274b. The output terminal of the NAND gate 274b is connected to a first input terminal of a NAND gate 275, a second input terminal of which is connected to the memory completion bus $17b_2$, and a third input terminal of which is connected through an inverter 276 to the supplementary request bus $17a_1$. The output terminal of the NAND gate 275 is connected to the NAND gate 277a of a flip-flop circuit 277 which has said NAND gate 277a and another NAND gate 277b. A differentiation circuits 278 connected to the output terminal of the NAND gate 277a, supplementary request bus $17a_1$ and memory completion bus $17b_2$ are connected to the different input terminals of a NAND gate 279. The output terminal of the NAND gate 279 is connected to the NAND gate 277b of the flip-flop circuit 277. The output terminal of an inverter 276 and the output terminal of the NAND gate 277a of the flip-flop circuit 277 are connected through an AND gate 280 to a first input terminal of a NOR circuit 281. The output terminal of the NAND gate 277b and the output terminal of the NAND gate 274a of the flip-flop circuit 274 are connected through an AND gate 282 to a second input terminal of the NOR circuit 281. The output terminal of the NOR circuit 281 is connected to the supplementary request bus $17a_2$. The output terminal of the NAND gate 277a of the flip-flop circuit 277 and the memory completion bus $17b_2$ are connected through an inverter 283 to the input terminal of a NAND gate 284. The output terminal of the NAND gate 284 is connected to the memory completion bus $17b_1$. The output terminal of the NAND gate 277b of the flip-flop circuit 277, inverter 283 and the output terminal of the NAND gate 274a of the flip-flop circuit 274 are connected through a NAND gate 285 to the reset terminal of the flip-flop circuit 271.

The interface circuit of the data exchange unit 217 facing the main bus assembly 11 is of the same type as that associated with the data processing units $12_1$ to $12_n$, description thereof being omitted.

There will now be described mainly by reference to FIGS. 7, 8 and 10 the operation of a data processing system according to the second embodiment of this invention having the aforementioned arrangement. The various buses 11a to 11f of a main bus assembly 11, supplementary bus assemblies 171 and 172 and a plurality of signal lines normally have a potential of "1." Where a request is made to use the main bus assembly by any of the data processing units $12_1$ to $12_n$, CPU 213 and 214, memory units 215 and 216 and data exchange unit 217, the request bus 11e has its potential changed to "0." When this condition is reached, the bus control unit 15 is put into operation as in the first embodiment to permit exchange of data between the prescribed units.

Where the CPU 213 and 214 desire the exchange data with the memory units 215 and 216 through the supplementary bus assemblies 171 and 172, the address of a called memory unit 215 or 216 is supplied to the address bus 17$c$. The flip-flop circuits of the interface circuits of the CPU 213 and 214 are set to change the potential of the supplementary request bus 17$a_1$ to "0." Where the CPU 213 and 214 deliver a request for the use of the supplementary bus assemblies 171 and 172 to the supplementary request bus 17$a_1$, said request is conducted to the interface circuit of the data exchange unit 217 of FIG. 8 to cause the output terminal of the inverter 276, namely, a first input terminal of the NAND gate 280 to have a potential of "1." Where, at this time, the data exchange unit 217 does not make a request for the supply of data from the memory unit, the flip-flop circuit 271 is not set, and the flip-flop circuit 274 is reset and a first input terminal of the flip-flop circuit 274 is supplied with a signal of "1." The memory completion bus 17$b_1$ also has a potential of "1." When, therefore, the inverter 276 generates an output of "1" upon receipt of a bus assembly-requesting signal, the NAND gate 275 generates an output of "0" to set the flip-flop circuit 277, causing the NAND gate 277$a$ to produce an output of "1." Accordingly, the NAND gate 280 is enabled to generate an output of "1," and the NOR gate 281 gives forth an output of "0." Accordingly, the bus assembly requesting signal delivered through the supplementary request bus 17$a_1$ is transferred to the supplementary request bus 17$a_2$ facing the memory units 215 and 216.

Where the data exchange unit 217 has already made a request for the use of the supplementary bus assemblies 171 and 172 by setting the flip-flop circuit 271, then the flip-flop circuit 274 is set to keep the potential of the first input terminal of the NAND gate 275 at "0." Later when the supplementary request bus 17$a_1$ has a potential of "0," the flip-flop circuit 277 remains in a reset state. When, therefore, the flip-flop circuit 274 is set, the NAND gate 282 is enabled to produce an output of "1." Accordingly, the NOR gate 281 generates an output of "0" and a bus assembly-requesting signal delivered from the data exchange unit 217 is conducted to the supplementary request bus 17$a_2$. Whether said bus 17$a_2$ is supplied either with a request made by the CPU 213 or 214 for the use of the supplementary bus assembly 17 or with a similar request made by the data exchange unit 217 is determined by a signal from the supplementary request bus 17$a_2$ or a "0" signal from the NAND gate 274, whichever reaches the NAND gate 275 earlier. Where a bus assembly-requesting signal from the CPU 213 or 214 is supplied to the supplementary request bus 17$a_2$, then signals denoting the address specified by the CPU 213 or 214 and the data associated with said address and an output signal from the NAND gate 277$a$ are ANDed together and supplied to the supplementary address bus 17$c_2$ and supplementary data bus 17$d_2$ associated with the memory units 215 and 216. Data delivered from the memory units 215 and 216 are ANDed with an output signal from the NAND gate 277$a$, and the signals thus ANDed are conducted to the supplementary data bus 17$d_1$ associated with the CPU 213 and 214. On the other hand where a request made by the data exchange unit 217 for the use of the supplementary bus assembly 17 is supplied to the supplementary request bus 17$a_2$, signals representing the address specified by the data exchange unit 217, the data associated with said address and an output signal from the NAND gate 277$b$ are ANDed together and conducted to the supplementary address bus 17$c_2$ and supplementary data bus 17$d_2$ associated with the memory units 215 and 216. Data delivered from the memory units 215 and 216 are ANDed with an output signal from the NAND gate 277$b$ and the signals thus ANDed are conducted to the data exchange unit 217.

Where the supplementary request bus 17$a_2$ is supplied with a request for the use of the supplementary bus assembly 17 made by the CPU 213 and 214 or the data exchange unit 217, then the interface circuit of the memory units 215 and 216 which is of the same type as that of FIG. 5 detects said request and is put into operation. If, in this case,the memory units 215 and 216 receive a request signal only through the supplementary bus assemblies 171 and 172, then the supplementary interface circuit 31$b$ is operated as in the first embodiment to set the flip-flop circuit 32, thereby starting the operation of the memory units 215 and 216. Where, however, the memory units 215 and 216 are simultaneously supplied with a request signal from the main bus assembly 11, then the interface circuit of said main bus assembly 11 is preferentially actuated.

There will now be described the case where a request is delivered only from the supplementary bus assemblies 171 and 172. The supplementary request bus 17$a_2$ has its potential changed to "0" upon receipt of a request signal, and is actuated in the same manner as in the first embodiment. The memory unit 215 or 216 is started to receive an address specifying signal from the supplementary address bus 17$c_2$ or from the main address bus 11$c$ according to the internal timing of the memory unit 215 or 216. Selection of these address buses 17$c_2$ and 11$c$ is determined by which of the flip-flop circuits of the interface circuit of said memory unit is set.

Where the operating mode of the main address bus 11$c$ and supplementary address bus 17$c_2$ is associated with the delivery of data from the memory unit 215 or 216, a set pulse is generated upon completion of said delivery to set a flip-flop circuit (corresponding to the flip-flop circuit 62 of the first embodiment), thereby causing the memory completion bus 17$b_2$ to have a potential of "0." When this condition is reached, the inverter 283 of FIG. 8 generates an output of "1." A NAND gate 284 is enabled to deliver a "0" signal to the memory completion bus 17$b_1$. Said "0" signal is further transmitted to the interface circuit of the CPU 213 or 214. As a result, the memory completion bus 17$b_2$ has its potential changed to "1." Delivery of data from the memory unit 215 or 216 is effected in the same manner as in the first embodiment. Thereafter the supplementary request bus 17$a_1$ has its potential returned to "1." Upon completion of one cycle of the operation of the memory unit 215 or 216, the flip-flop circuit included in the interface circuit of the memory unit is reset to bring the entire data processing system to the original state.

Where a bus assembly-requesting signal is simultaneously supplied to both main bus assembly 11 and a group of supplementary bus assemblies 171 and 172 or to the main bus assembly 11 alone, then the interface circuit of the main bus assembly 11 is put into operation to permit exchange of data between any of the data processing units acting as a master unit and the memory unit 215 or 216.

Figure 10:
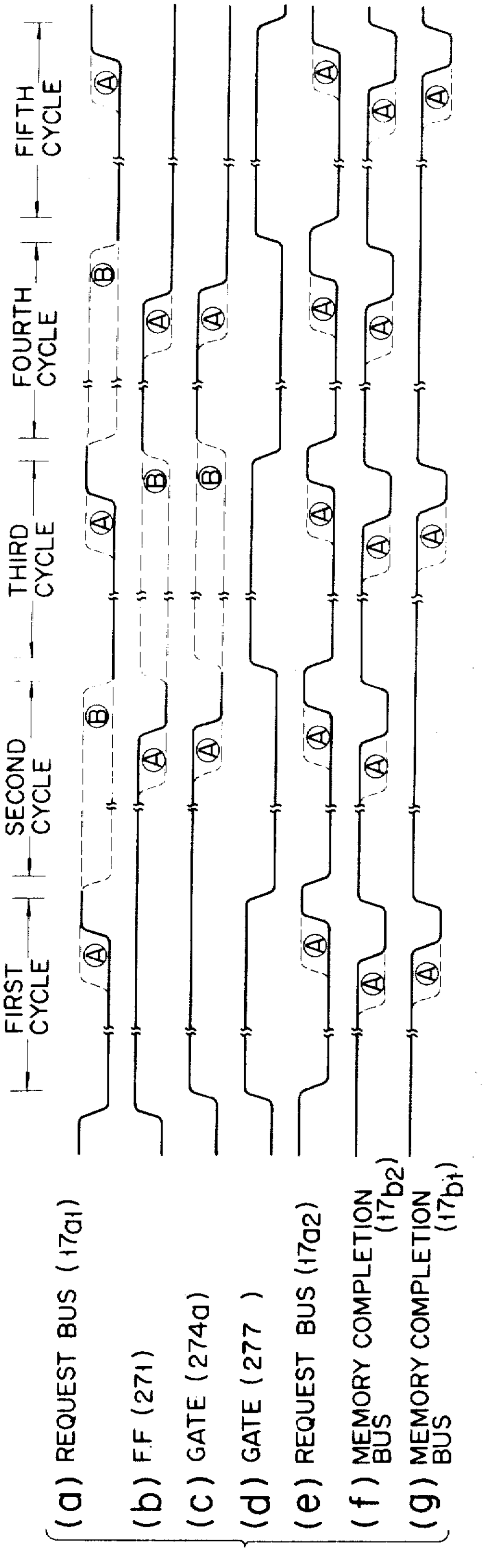
FIG. 10 is a timing chart illustrating the operation of the second embodiment of FIG. 7.

FIG. 10 illustrates the operation of the interface circuit of the data exchange unit of FIG. 8. The first cycle represents the case where a bus assembly-requesting signal from the CPU 213 or 214 reached the NAND gate 275 a little earlier than that from the data exchange unit 217. FIG. 10 shows that in the first cycle, data is exchanged between the CPU 213 or 214 and the memory unit 215 or 216 through the supplementary bus assembly 171 or 172. When the memory completion bus $17b_2$ has its potential changed from "0" to "1" at the end of the first cycle, a signal of "1" is conducted to the NAND gate 279 through the differentiation circuit 278. An output from the NAND gate 279 is supplied to the flip-flop circuit 277 to cause it to produce a signal of "0." This time, a bus assembly-requesting signal from the data exchange unit 217 is supplied to the supplementary request bus $17a_2$ through the NAND gate 282 and NOR circuit 281. Thus in the second cycle, data is exchanged between the data exchange unit 217 and the memory unit 215 or 216 through the supplementary bus assembly 171 or 172. Where, in the second cycle, the memory completion bus $17b_2$ has a potential of "0," then the flip-flop circuit 271 is reset. After completion of a required operation, for example, receipt of data, the data exchange unit 217 supplies a reset signal to the NAND gate 273, causing the NAND gate 274*a* of the flip-flop circuit 274 to generate an output of "0." The third cycle denotes the case where the CPU 213 or 214 made a request for the use of the bus assembly earlier than the data exchange unit; the fourth cycle represents the case where the data exchange unit 217 made a similar request earlier than the CPU 215 or 216; and the fifth cycle relates to the case where the CPU 215 or 216 alone made such request. As is apparent from FIG. 10, the delivery of data from the memory unit 215 or 216 may be effected in the Ⓐ section in a manner modified as shown in broken lines. In the Ⓑ section, said delivery of data may be effected at either of the levels indicated in broken lines. The foregoing description refers to the operation of the memory unit 215 relative to the CPU 213 and that of the memory unit 216 relative to the CPU 214. Since the supplementary bus assemblies 171 and 172 are each provided with the interface circuit of FIG. 8, all these units can be operated independently of each other.

As described above, a data processing system according to the second embodiment of this invention enables the CPU 213 or 214 to exchange data with the memory unit 215 or 216 through the supplementary bus assembly 171 or 172 even when any of the first and *n*-order data processing units $12_1$ to $12_n$ uses the main bus assembly 11. Further, provision of the data exchange unit 217 makes it possible to read out data from one of the memory units 215 and 216 and transmit said data to the other memory unit, thus permitting exchange of data between different series of units.

To repeat, the data processing system of this invention allows the CPU to exchange data with the memory unit through the supplementary bus assembly without being affected by the use of the main bus assembly by any of the other data processing units, and further enables exchange of data between the memory units belonging to different series of data processing units.

What we claim is:

1. A data processing system comprising:

a plurality of data processing units including an arithmetic operation unit, a memory unit and peripheral data processing units, said data processing units being connected in series by a signal line;

a main bus assembly including a request bus, a master synchronization bus, a slave synchronization bus and a data bus for connecting said data processing units in parallel so as to effect exchange of data with each other;

a main bus control unit for delivering a "who" signal to the first unit of said serially connected data processing units upon receipt of a request signal via said request bus, and which comprises a first NAND gate including a first input terminal connected to said request bus and a second input terminal connected to said master synchronization bus, a second NAND gate including an input terminal connected to said slave synchronization bus, a third NAND gate including a first input terminal connected to said master synchronization bus and a second input terminal connected to the output terminal of said second NAND gate, and a fourth NAND gate including a first input terminal connected to the output terminal of said first NAND gate, a second input terminal connected to the output terminal of said third NAND gate and a "who" signal output terminal connected to the input terminal of said first unit;

a plurality of first interface circuits each of which is associated with said respective data processing units said interface circuits being connected to receive said "who" signal via said signal line, transmit the "who" signal to the immediately following data processing unit when a data processing unit receiving the "who" signal does not generate a request signal to said request bus for the use of said main bus assembly, prevent the "who" signal from being further transferred to the immediately following data processing unit when a data processing unit receiving the "who" signal has already generated a request signal to said request bus, and select a called data processing unit associated with the address signal given forth by the request signal generated by a data processing unit so as to connect a desired two data processing units by the main bus assembly;

a supplementary bus assembly for connecting at least the arithmetic operation unit to the memory unit via a second interface circuit which is associated with said supplementary bus assembly for giving preference to one of the main and supplementary assemblies when said assemblies are supplied with the request signals for using the main and supplementary assemblies, and which is reached by the earlier one of said signals for executing the data change between the arithmetic operation unit and memory unit through the supplementary bus assembly independently of the operation of the main bus assembly when exchange of data takes place between the peripheral data processing units through the main bus assembly.

2. The data processing unit according to claim 1 wherein the main bus assembly includes a request bus for conducting a request made by any of the aforesaid data processing units for the use of the main bus assembly to a main bus control unit; a "who" signal synchronization bus for applying a "who" signal synchronization signal indicating that the "who" signal delivered from the main bus control unit is stopped at any of the aforesaid data processing units which has already requested the use of the main bus assembly for exchanging the data with the desired other data processing unit; a data bus for effecting exchange of data between the aforesaid data processing units; an address bus for transmitting the address specified by a bus assembly-requesting unit to the selected called unit; a master synchronization bus for conducting a master synchronization signal showing the condition of a data processing unit requesting the use of the main bus assembly to said desired other data processing unit and also to the bus control unit; and a slave synchronization bus for supplying the bus assembly-requesting unit and bus control unit with a slave synchronization signal indicating that said desired other data processing unit has completed exchange of data with said bus assembly-requesting unit.

3. The data processing system according to claim 1 wherein the bus control unit includes a first gating circuit which generates a "who" signal upon receipt of a request for the use of the main bus assembly from any of the aforesaid data processing units and, upon completion of exchange of data between the bus assembly-requesting unit and said desired other data processing unit, shuts off the transmission of said "who" signal.

4. The data processing system according to claim 1 wherein the first interface circuit includes a flip-flop circuit which, when set by a bus assembly-requesting signal of its own associated data processing unit which desires the use of said assembly, supplies the request bus with said bus assembly-requesting signal; a second gating circuit which, when said flip-flop circuit is in a reset state when supplied with the "who" signal, transfers said "who" signal to the immediately following data processing unit and, when said flip-flop circuit is in a set state at the arrival of the "who" signal, prevents said "who" signal from being further transmitted from a data processing unit to the immediately following data processing unit; a third gating circuit which, when the flip-flop circuit receives said "who" signal in a set state, generates a master synchronization signal according to the internal timing signal of the data processing unit which has issued said "who" signal; a circuit generating a "who" signal synchronization signal showing that said "who" signal has been conducted exactly to the data processing unit which has actually requested the use of the main assembly; and a fourth gating circuit which, when the selected called data processing unit completes operation based on the data delivered from the bus assembly-requesting data processing unit, resets the flip-flop circuit by a slave synchronization signal generated at the time of said completion.

5. The data processing system according to claim 4 wherein the first interface circuit further includes a comparing circuit which compares its own address with the one delivered through the address bus from the main bus assembly-requesting data processing unit and, when both addresses synchronize with each other, generates a signal representing data being transmitted back to said bus assembly-requesting data processing unit from the selected called data processing unit; a fifth gating circuit for producing a signal to start the operation of the selected called data processing unit when the comparing circuit gives forth an output signal and the master synchronization bus is supplied with a master synchronization signal from the first interface circuit; and a sixth gating circuit for generating a slave synchronization signal when the selected called data processing unit completes its operation.

6. The data processing system according to claim 1 wherein the supplementary bus assembly includes a request bus which supplies the memory unit with a request made by at least the arithmetic operation unit for the use of the supplementary bus assembly; a memory completion bus which supplies the arithmetic operation unit with a memory completion signal delivered from the memory unit when it completes its operation; and an address bus for transmitting an address signal from at least the arithmetic operation unit to the selected called data processing unit.

7. The data processing system according to claim 1 wherein the supplementary bus assembly further includes an additional interface circuit which generates a signal requesting the use of the supplementary bus assembly upon receipt of a request made by the arithmetic operation unit for the use of said assembly and permits exchange of data between the arithmetic operation unit and memory unit until the memory completion bus gives forth a memory completion signal; and a further interface circuit formed at least in the memory unit to connect the memory unit to the arithmetic operation unit through the supplementary bus assembly upon arrival of a bus assembly-requesting signal from said arithmetic operation unit.

8. The data processing system according to claim 7 wherein the additional interface circuit includes a second flip-flop circuit which, when set by a bus assembly-requesting signal delivered from the arithmetic operation unit, supplies said signal to the supplementary request bus; and a gating circuit for resetting said second flip-flop circuit upon receipt of a memory completion signal from the memory completion bus.

9. The data processing system according to claim 7 wherein the further interface circuit includes a comparing circuit which compares its own address with the one delivered through the supplementary address bus from the arithmetic operation unit and, when both addresses correspond with each other, generates a signal representing data being delivered from the memory unit associated with said address; a first flip-flop circuit for storing according to an output from the comparing circuit a signal showing whether there is made any request for the use of the supplementary bus assembly; a second flip-flop circuit for storing a signal indicating the operating condition of the supplementary bus assembly; and a third flip-flop circuit for generating a pulse to start the operation of the memory unit when the first and second flip-flop circuits are brought to a reset state.

10. The data processing system according to claim 1 wherein the supplementary bus assemblies include a request bus for supplying the memory units with a signal requesting the use of said supplementary bus assemblies delivered from at least the arithmetic operation units; a memory completion bus for supplying the arithmetic operation units with a memory completion signal generated from the memory units when they complete operation; and an address bus for supplying the selected called unit with a signal denoting the address specified by at least the arithmetic operation units.

* * * * *

UNITED STATES PATENT OFFICE

CERTIFICATE OF CORRECTION

Patent No. 3,810,114 Dated May 7, 1974

Inventor(s) Hirohide YAMADA et al

It is certified that error appears in the above-identified patent and that said Letters Patent are hereby corrected as shown below:

On initial page of patent, under the heading of Foreign Application Priority Data, change Japanese Application Nos. "46-708" and "46-2067" to --47-708-- and --47-2067--, respectively.

Column 18, last line, after "bus for" change "applying" to -- supplying --.

Signed and sealed this 22nd day of October 1974.

(SEAL)
Attest:

McCOY M. GIBSON JR.
Attesting Officer

C. MARSHALL DANN
Commissioner of Patents